US010713665B2

United States Patent
Fan et al.

(10) Patent No.: US 10,713,665 B2
(45) Date of Patent: Jul. 14, 2020

(54) APPARATUSES, METHODS AND SYSTEMS FOR AN ONLINE REWARDS INCENTIVE PROGRAM

(75) Inventors: Maureen Fan, Foster City, CA (US); Ha (Nancy) Hang, San Francisco, CA (US); Aaron Ligon, Millbrae, CA (US); Michelle Koh Potts, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 398 days.

(21) Appl. No.: 13/244,709

(22) Filed: Sep. 26, 2011

(65) Prior Publication Data

US 2012/0150695 A1 Jun. 14, 2012

Related U.S. Application Data

(63) Continuation of application No. 13/083,526, filed on Apr. 8, 2011, now Pat. No. 10,332,125.

(60) Provisional application No. 61/421,611, filed on Dec. 9, 2010.

(51) Int. Cl.
*A63F 13/00* (2014.01)
*G06Q 30/02* (2012.01)
*G06Q 30/06* (2012.01)
*G06Q 50/00* (2012.01)

(52) U.S. Cl.
CPC ........ *G06Q 30/02* (2013.01); *G06Q 30/0641* (2013.01); *G06Q 50/01* (2013.01)

(58) Field of Classification Search
USPC .......................................... 705/14
See application file for complete search history.

(56) References Cited

U.S. PATENT DOCUMENTS

| | | | |
|---|---|---|---|
| 2002/0072412 A1* | 6/2002 | Young | G06Q 30/02 463/42 |
| 2002/0142842 A1* | 10/2002 | Easley et al. | 463/42 |
| 2006/0287105 A1* | 12/2006 | Willis | 463/42 |
| 2009/0197670 A1* | 8/2009 | Kelly | G07F 17/3225 463/25 |
| 2011/0004660 A1* | 1/2011 | Battle | G06Q 10/10 709/205 |
| 2011/0092282 A1* | 4/2011 | Gary | 463/31 |
| 2011/0269548 A1* | 11/2011 | Barclay et al. | 463/42 |
| 2012/0115603 A1* | 5/2012 | Shuster | A63F 13/12 463/31 |

* cited by examiner

*Primary Examiner* — John Van Bramer
*Assistant Examiner* — Darnell A Pouncil
(74) *Attorney, Agent, or Firm* — Penilla IP, APC

(57) ABSTRACT

Software on a server receives a game action message associated with one of a plurality of online games being played by a user. The software generates an asset message based at least in part on the game action message. The software determines user feed preferences based on a social filter graph. The social filter graph depends at least in part on a metagame account associated with the user. And the software transmits the asset message to social network identifiers according to the user feed preferences.

20 Claims, 10 Drawing Sheets

FIGURE 2  Example ORIP_component  2 01

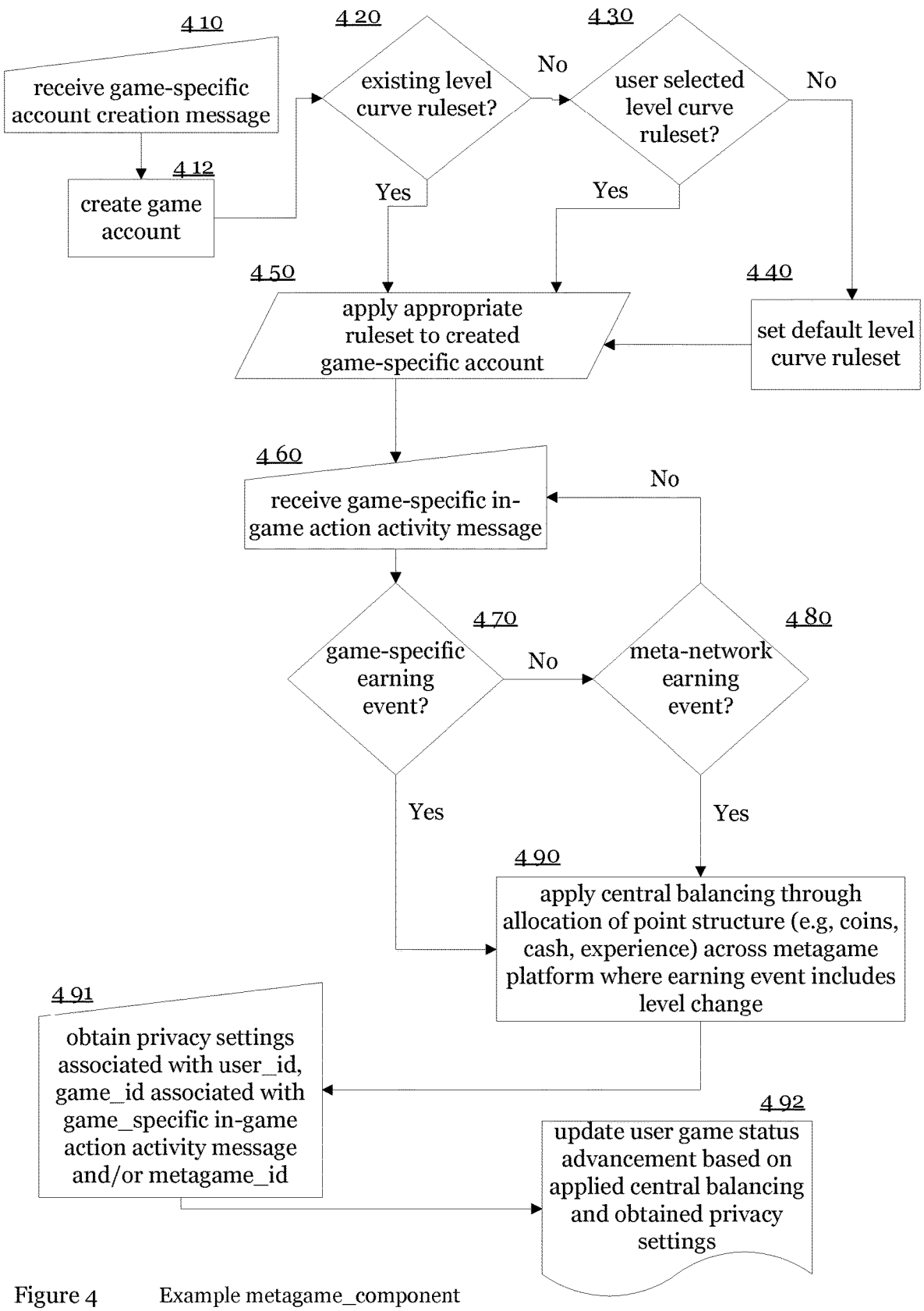
Figure 4    Example metagame_component

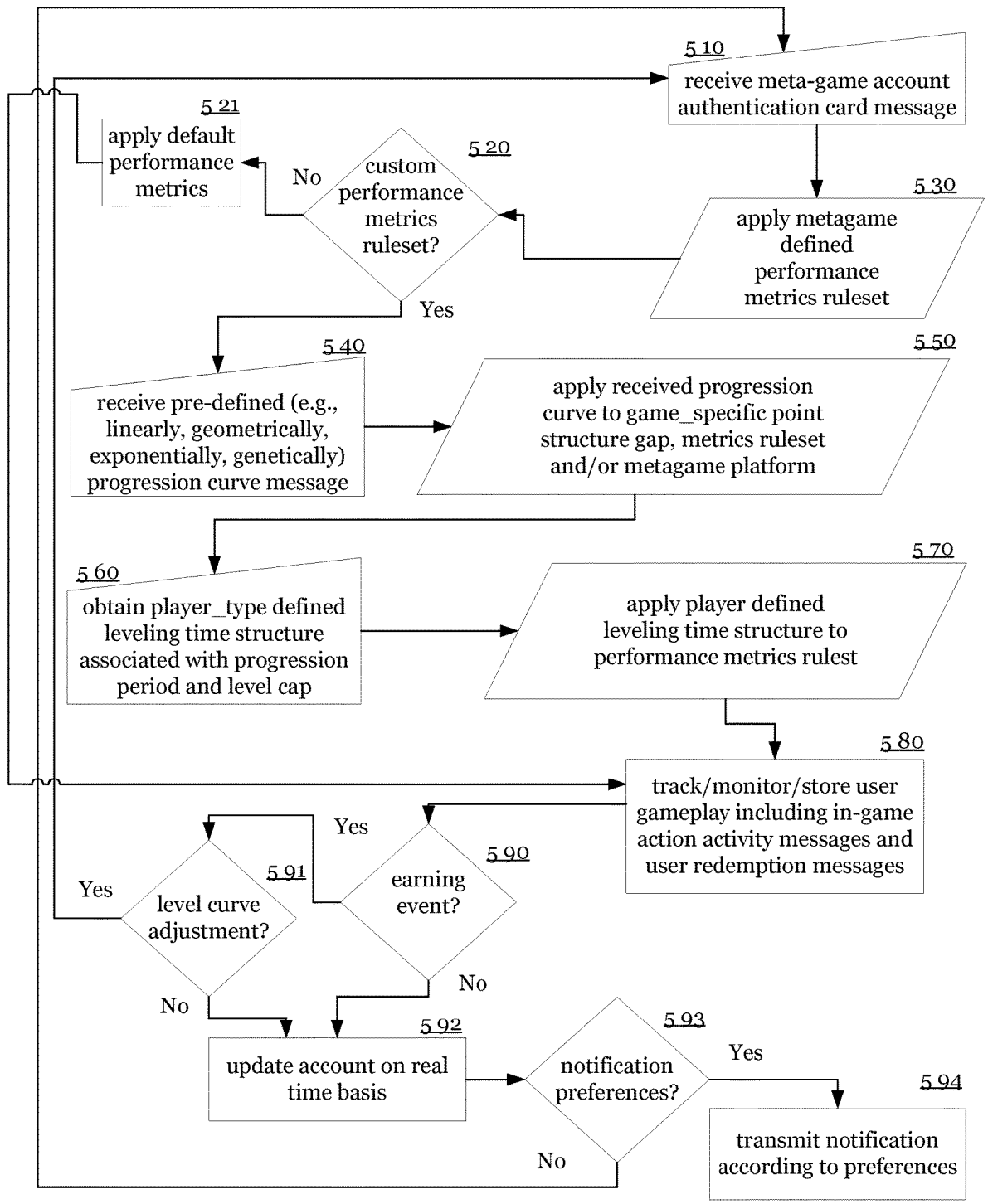
Figure 5    Example level_curve_component

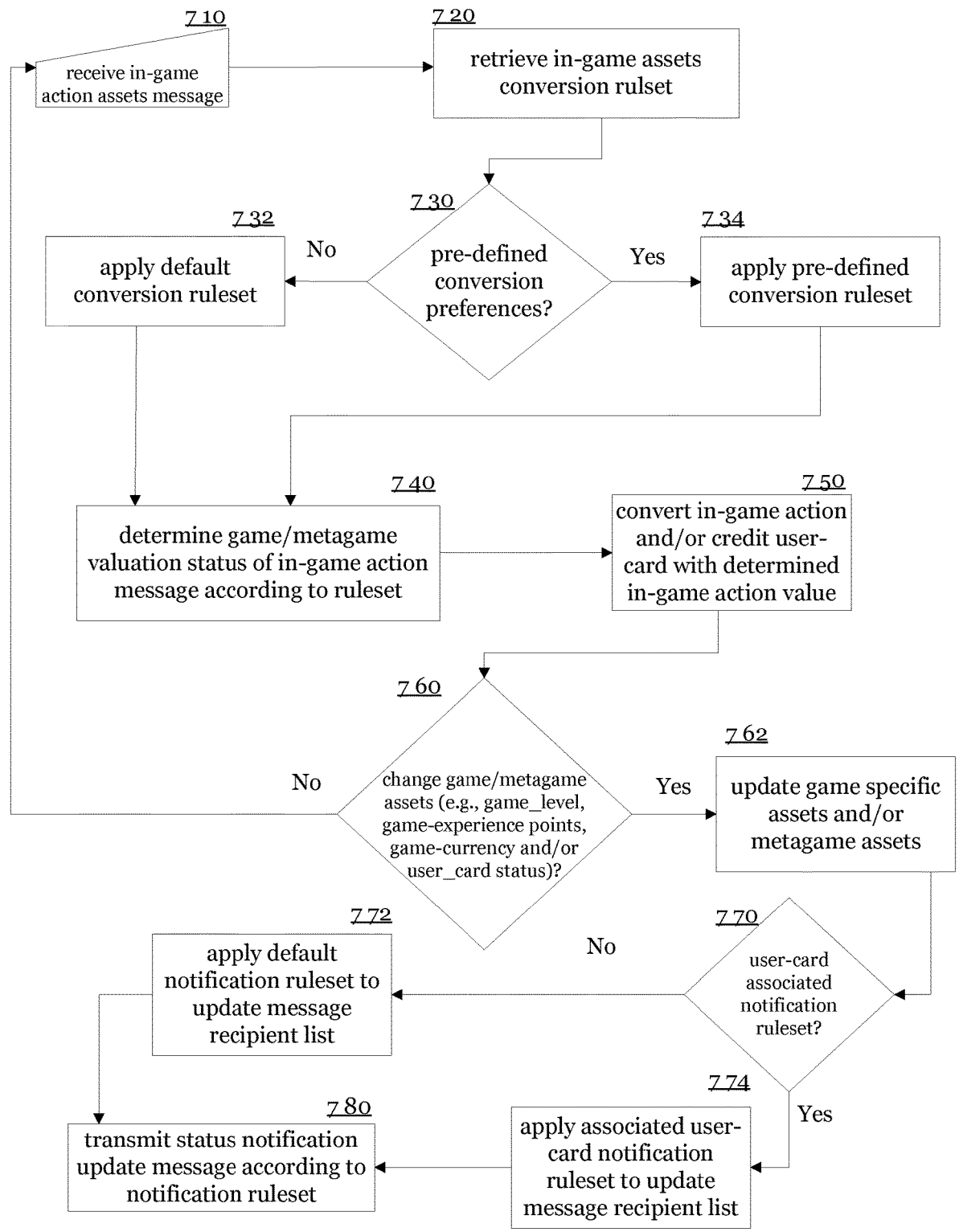
Figure 7　　Example metagame_component

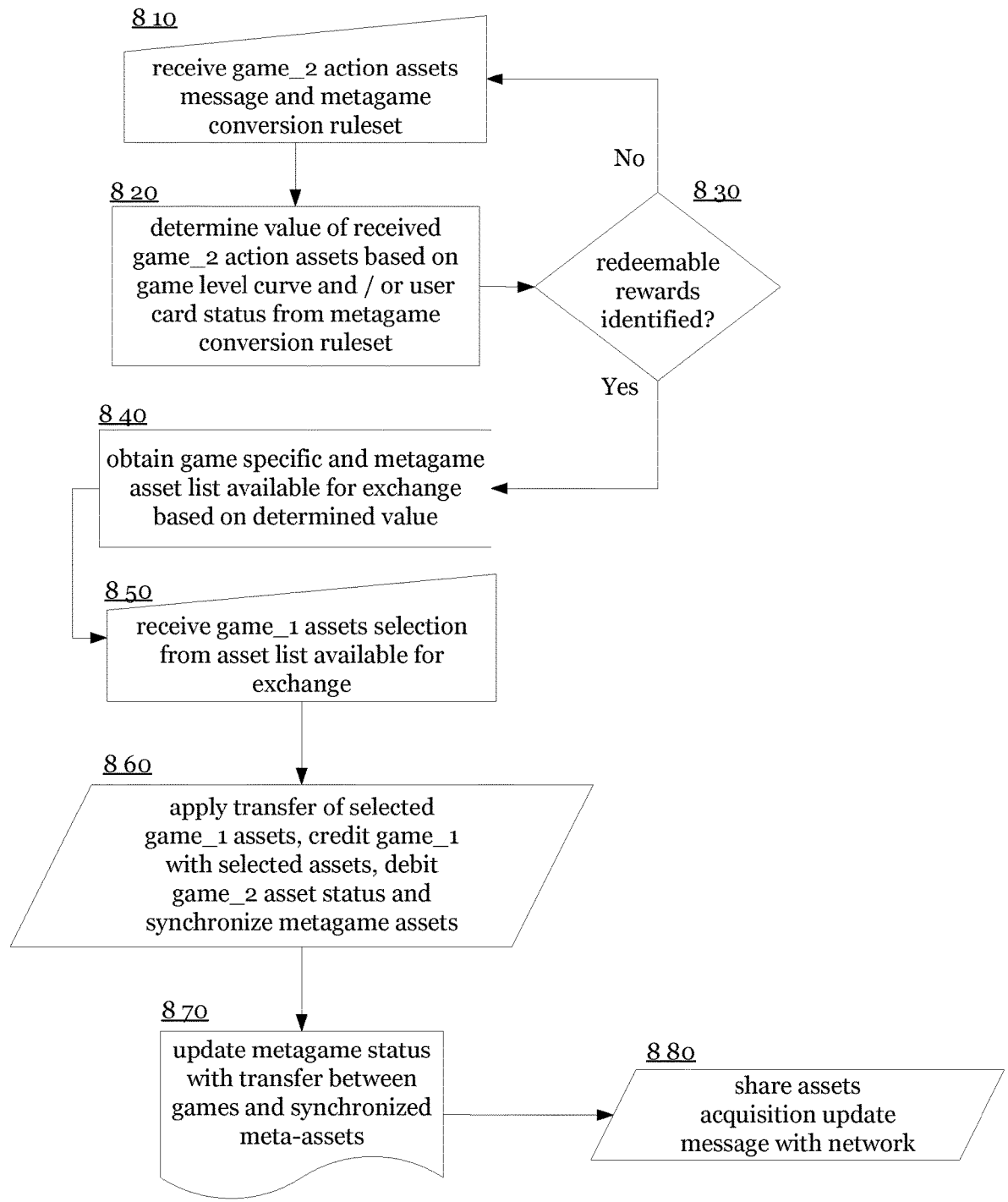
Figure 8      Example game_sync_component

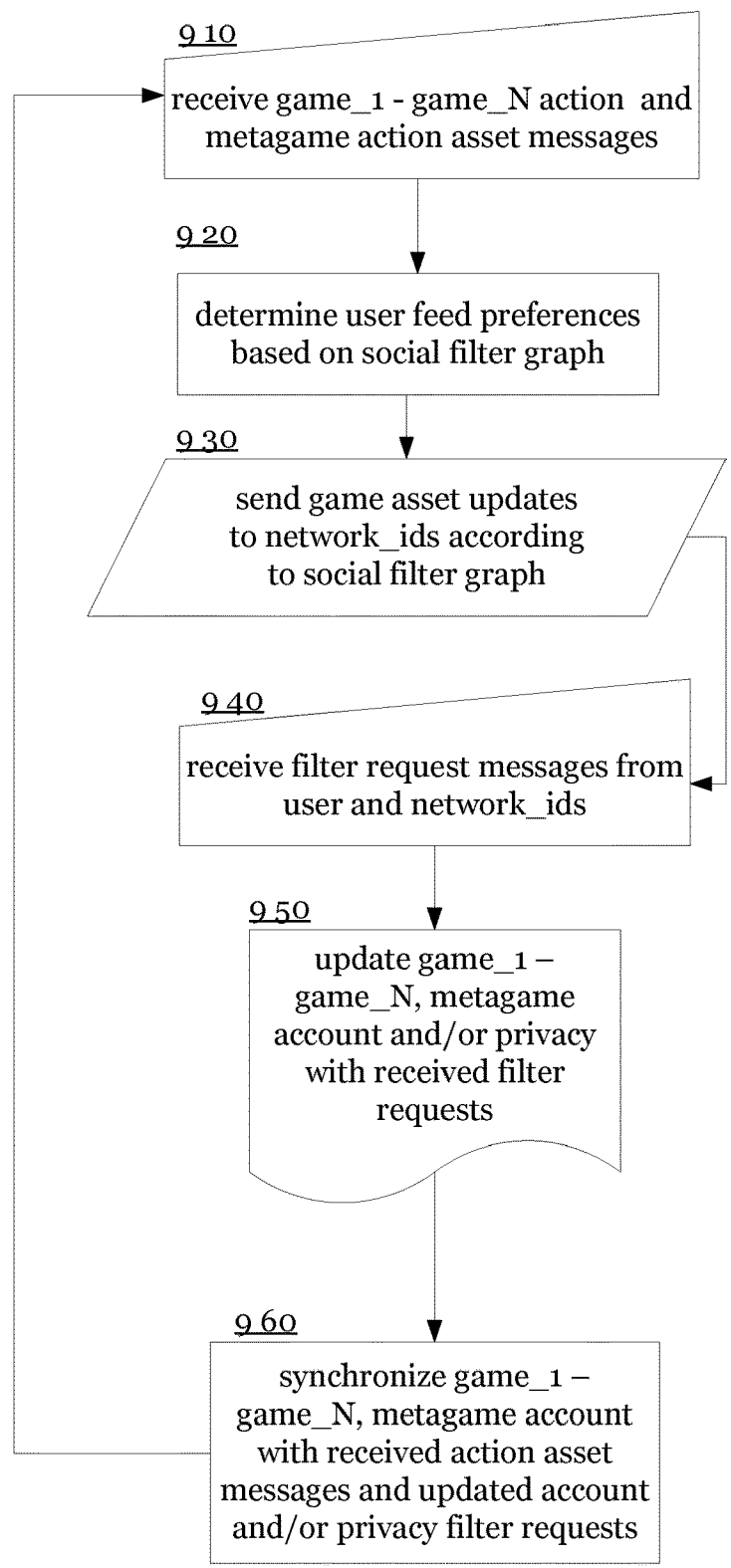
Figure 9    Example game_sync_component

APPARATUSES, METHODS AND SYSTEMS FOR AN ONLINE REWARDS INCENTIVE PROGRAM

RELATED CASES

This application is a continuation of U.S. patent application Ser. No. 13/083,526 filed on Apr. 8, 2011, now U.S. Pat. No. 10,332,125 entitled "APPARATUSES, METHODS AND SYSTEMS FOR AN ONLINE REWARDS INCENTIVE PROGRAM", which claims priority under 35 U.S.C. § 119 to provisional application Ser. No. 61/421,611 filed Dec. 9, 2010, entitled "APPARATUSES, METHODS AND SYSTEMS FOR AN ONLINE REWARDS INCENTIVE PROGRAM." This application claims priority to all of the aforementioned applications and the entire contents of the aforementioned applications are herein expressly incorporated by reference.

FIELD

The present innovations are directed generally to online games, and more particularly, to APPARATUSES, METHODS AND SYSTEMS FOR AN ONLINE REWARDS INCENTIVE PROGRAM.

BACKGROUND

The online gaming community includes a diverse user base of players at different skill, experience and engagement levels. To some players, the gaming environment is brand new. Expert professional gamers also exist. Software programs may have tutorials and help files to assist users.

SUMMARY

The APPARATUSES, METHODS AND SYSTEMS FOR AN ONLINE REWARDS INCENTIVE PROGRAM (hereinafter "ORIP") transforms gameplay inputs via ORIP components into a tailored rewards incentive structure outputs. The ORIP may monitor user gameplay associated with a metaGame account and provide a rewards incentive in exchange for user gameplay activities.

BRIEF DESCRIPTION OF THE DRAWINGS

The accompanying appendices and/or drawings illustrate various non-limiting, example, innovative aspects in accordance with the present descriptions:

FIG. 4 illustrates aspects of logic flow operations for one embodiment of the ORIP platform;

FIG. 5 illustrates further aspects of logic flow operations for one embodiment of the ORIP platform;

FIG. 6 illustrates a sample screenshot of one component of the ORIP platform in one embodiment;

FIG. 7 illustrates aspects of logic flow operations for one embodiment of the ORIP platform;

FIG. 8 illustrates aspects of logic flow operations for one embodiment of the ORIP platform;

FIG. 9 illustrates aspects of logic flow operations for one embodiment of the ORIP platform;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The ORIP platform and components may include a network such as a online game network for a unique and advantageous gaming experience across a number of games. In one embodiment, the ORIP platform overlays a metaGame on an online game network, allowing the creation and tracking of a set of game metrics deriving, but separate from user game play in one or more online network games. In one embodiment, the ORIP platform may include a tailored account, scoring and/or performance metrics, game-points, game-coins, game-levels, game-milestones, game-cash, in-game virtual goods and/or the like. Additionally, the metaGame may define earning events and notification settings based on set preferences.

Online game operators desire to keep users engaged and interested throughout the gaming experience. Basic and instructive game activities help provide new users with an understanding of game mechanics. To other more advanced users a challenging level of play and proportional reward system provides the proper incentive for continued gameplay.

Figure 1:
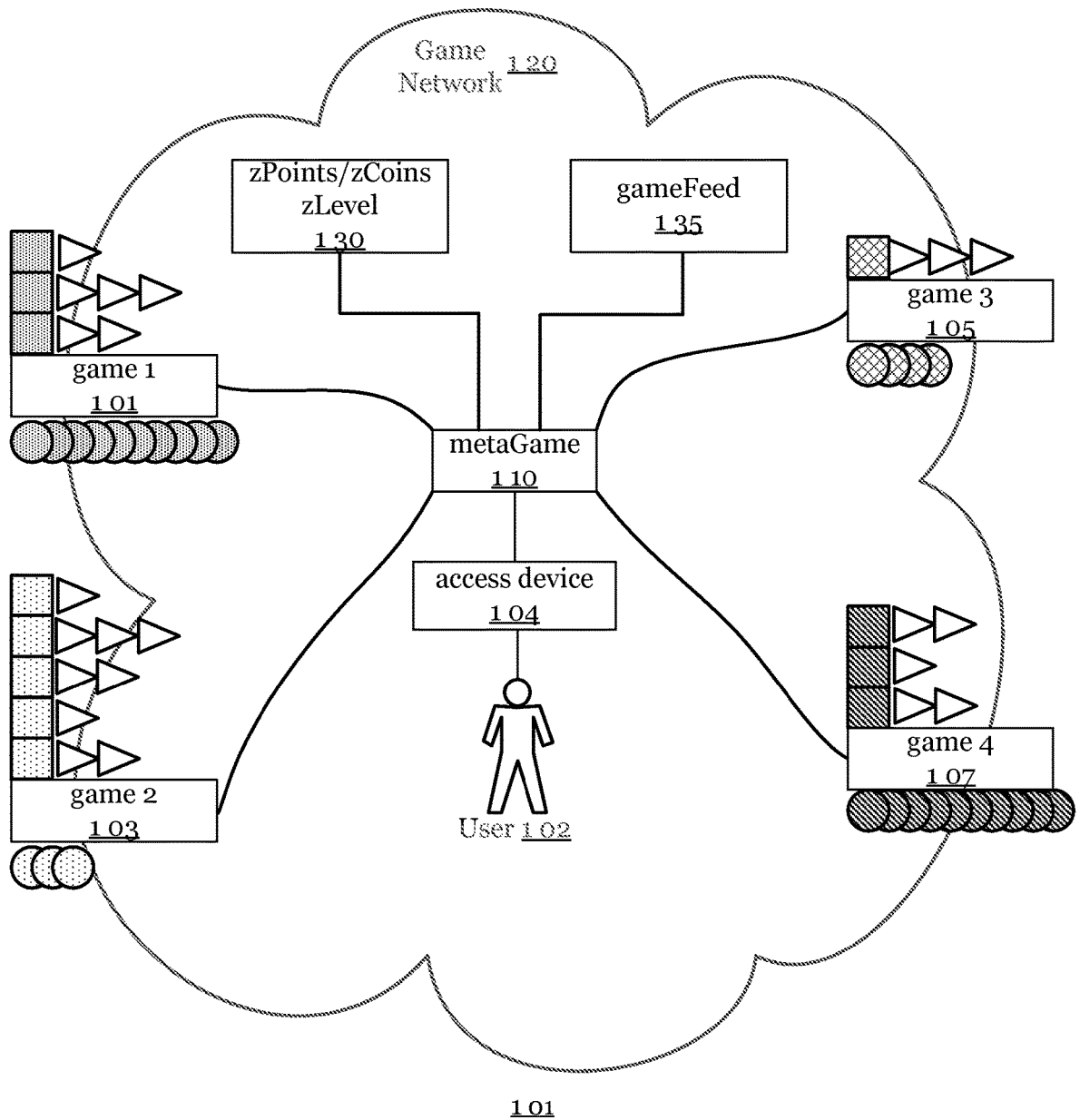
FIG. 1 illustrates one example of an ORIP embodiment.

FIG. 1 illustrates one example of an ORIP embodiment. As illustrated in FIG. 1, a user 102 may use an access device 104 to facilitate communication with metaGame 110 and/or game network 120. The metaGame may include associations with several games such as 101, 103, 105, and 107. As illustrated, in one implementation, each game may keep track of a user's coins, level, milestones and/or the like. In one embodiment, the metaGame may include its own metrics for scoring and/or tracking user performance during game_play 130.

As illustrated in the example embodiment of FIG. 1, games 1-4 may include associations with game assets. For example, game assets may include a game level, a first game_currency value (coins), a second game_currency value (cash), an experience points value and/or the like. According to one implementation, the metaGame platform, games 1-N or games otherwise external to the metaGame platform may include additional assets such as, for example, game score, badges, badge collections, game defined user_roles, level curve, temporally tiered levels, user_type, login records, bonuses, promotions, penalties, digital content (e.g., image files, icons, audio files, video files), gifts, tokens, mayorships, rewards, invitation permissions, avatars, rally points, diaries, footprints, trophies, ranking rulesets, competitions, engagement modes, user difficulty modes (e.g., novice, intermediate, expert), stars, medals, gems, pets, exploration quests and/or the like. In addition, a specific game and/or the metaGame platform may, according to one embodiment, utilize combinations of valuation and/or revenue models such as, for example, a subscription model, a prepaid model, a freemium model and/or the like.

In one such implementation, ORIP provides a mechanism for engaging users at a game network level by rewarding and recognizing gameplay behaviors and milestones on a real time basis across any number of unique games, such as 101, 103, 105, and 107 that have been identified and included in the game network. In one embodiment, units such as "ZPoints" or "ZCash" or "ZCoins" may be earned through in-game actions, i.e. actions taken while playing a game. Units such as ZPoints may be updated in real time in 130 so that a status bar with the updated ZPoints may be visible on a user's gameplay display and/or through designated channels to a gaming network, or social network, via XML feeds and/or badges or other visual mechanisms.

In one implementation, coins such as ZCoins may be earned by users playing games in a game network. ZCoins may be earned by progressing to the next level or through purchase of in-game cash for example, farm cash. In such an implementation, game curves for ZCoins can be earned by leveling up. The type and kinds of rewards that may be redeemed can vary from game to game and level to level of a game. In one implementation, limitations may be placed on how many ZCoins a user can earn per day (1) within a given game, and (2) across games played within a game network. In one implementation, ZCoins may not be visible to the user and redeemable only in a predefined rewards store. In one implementation, usage of ZCoins may be partially visible to other users once special items are purchased in a rewards store for placement or usage in a unique game as a recursive user benefit.

In one implementation, an in-game action may provide a reward through an in-game conversion in the rewards store. Any reward redemption in a rewards store may be displayed as a status update to other users of the gaming network or to a user's social network, if the user's privacy settings allow such status updates. In one implementation, a user may select the level of privacy for displaying or hiding various gaming statistics including levels, badges, rewards, ZCoins, ZCash, ZPoints, reward redemptions, referrals, and other gaming information.

In one embodiment, ZCoins may be redeemable outside of an identified game network for real world items, non-virtual items, charitable donations, and/or paid sponsor benefits (for example, a 6-month magazine subscription, yearly newspaper subscription). In another implementation, ZCoins may be redeemable (one way) or exchangeable (two ways) for meta-virtual currencies (for example, Facebook Credits) if such a meta-currency is eligible to buy a threshold level of identified in game currencies.

In one implementation, the ORIP and/or network may establish a gameFeed to distribute information 135 about the user and/or associated gameplay.

In one embodiment a user metrics collector and/or dashboard may reflect a number of ZPoints and/or ZCoins owned by a user. In one implementation, other users in a gaming network or social network may be able to view how many ZPoints and/or ZCoins have been earned in a game along with other statistical analysis of the rewards collected in a user metrics collector and/or dashboard. In one implementation, ZPoints may include two distinct point structures such as ZCoins and ZCash. In such an implementation each point structure may be operate independently, but may also inform the attributes of the other.

Figure 2:
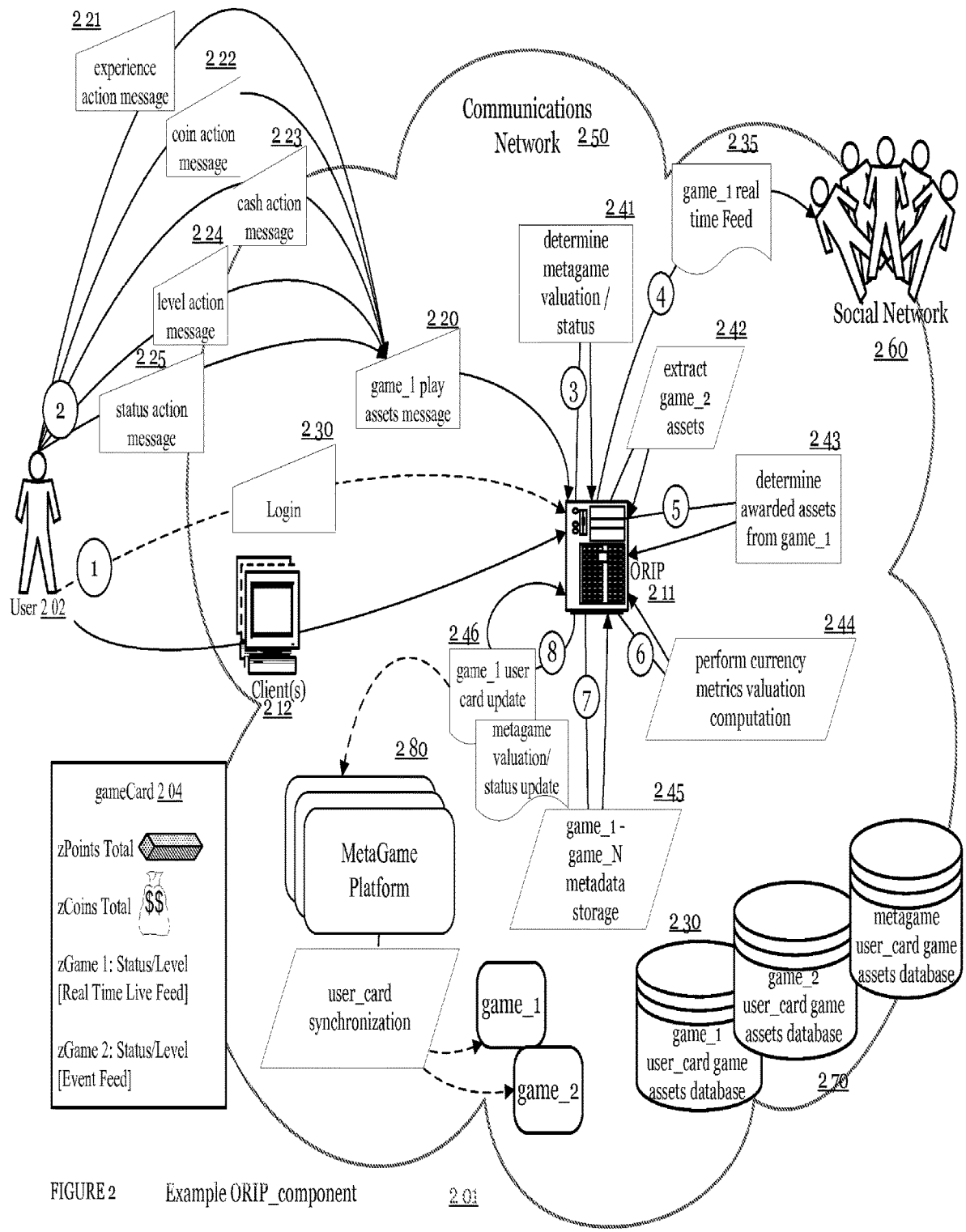
FIG. 2 illustrates some of the transforming aspects in one embodiment of ORIP operations.

FIG. 2 illustrates some of the transforming aspects in one embodiment of ORIP operations. As illustrated in FIG. 2, a user may login to a game and/or metaGame via the ORIP server 230. In one embodiment, the user may send game_1 play assets messages 220 to ORIP components. According to one example implementation, the user may send an experience action message (accumulated experience points), a coin action message, a cash action message, a level action message, and/or a status action message, respectively illustrated in FIG. 2 as 221, 222, 223, 224 and 225. ORIP operations may, in one embodiment, receive the game_play messages and determine a metaGame valuation and/or status. In addition, ORIP components may publish a game_1 real time feed 235 to a social network 260 or, selectively, a subset of action messages.

According to one implementation, some of the transforming aspects of ORIP operations may include a valuation from extracting game_2 assets 242 and determining awarded assets from game_1. In addition, one embodiment may include performing a currency metrics valuation computation 244. As illustrated in FIG. 2, ORIP components may store 245 game_1-game_N metadata in one or more database(s). In one embodiment, the server may send one or more output(s) 246, for example, a game_1 user card update message and a metaGame valuation/status update. As depicted in the illustrated embodiment of FIG. 2, one or more outputs may return to the server for distribution over the communications network 250 and/or the metaGame platform 280. In one embodiment, as illustrated with exemplar XML code the metaGame platform may send (and/or receive) user synchronization data to (and/or from) game_1 and game_2.

```
GET /purchase.php HTTP/1.1
Host: www.orip.com
Content-Type: Application/XML
Content-Length: 1306
<?XML version = "1.0" encoding = "UTF-8"?>
<sync_request>
    <selected game sync request>
        <game1
            name="Farmville
            social_network="zynga_network"
            username="FarmName User"
            password="FarmName Password"
        </game1>
        <game2>
            name="Cityville"
            social_network="regional"
            username="AnyCity_Name User"
            password="City Password"
        /game2>
    ...
        <gameN>
            name="Mafia Wars"
            social_network="ztwitter">
            username="Mafia Name"
</gameN>
    </selected sync request>
    <game request>
        <game_id>rewardsville</game_id>
        <activity type>earn points</activity type>
        <msg_type>level up</msg_type>
        <crew_participant_offer>prizeID_1</crew_participant_offer>
            <requestor_selected_item>dragon saddle ID1234
        </requestor_selected_item>
        </game request>
</sync_request>
</xml>
```

In one embodiment, some of the transforming aspects of ORIP operations may include a user, a user card, a client computer and an ORIP server. The user may sign into the metaGame platform by logging in with credentials or signing up as a new user. While logged into the game network a user may play a game and/or proceed with in-game activities. For example, the user may purchase game cash, unlock a content item, engage in a virtual goods transaction, and/or the like.

In one embodiment, the metaGame network may further include a rewards store. In one embodiment, the metaGame server 211 may include a rewards store for processing virtual input transactions. These transactions, including in-game activity may be distributed to various channels included or associated with the game network 250. In one embodiment, rewards include a selection of virtual goods. Additionally, rewards may include in-game items, such as, game boosts, in-game decorative items, other online incentives and promotions, real world game or metaGame branded merchandise and/or other real world goods, services and/or discounts. In one embodiment, rewards may be combined with game badges, game achievements, experience points and/or user status. In one embodiment, rewards comprising unique virtual goods maybe offered for in game use that would not otherwise be obtainable from in game play alone. In one embodiment, rewards comprising virtual goods once provided but no longer made available in game may be offered.

In one embodiment, a user may offer items retired from a social network store as well as place items onto a social network store after a predetermined period of time in the rewards store, e.g. 30 days. From a metaGame perspective, the cost of a rewards store offsets opportunity and revenue cannibalization costs by increasing network value through user retention. For example, the rewards store may provide a percentage increase retention lift (e.g., 15% retention increase) and increase the average number of games played in the metaGame network. In one embodiment, only metaGame currency may be used to acquire rewards in the rewards store. Additionally, in one implementation, the rewards store may be a platform offered to other services. For example, APIs and customization features may be established and/or provided to allow for widespread use of the platform by other Internet sites and services.

In one implementation, the metaGame rewards store pricing model may be based on an amount of reward points earned at each level up and an unlock point. The prices may be set so as to allow users to buy newly unlocked items as soon as they reach an unlock point. (e.g., through a certain amount of gameplay time spent and/or through pre-designated in game achievements). In one embodiment, the structure of the pricing model allows a user to purchase approximately five items between each unlock point. For example, in one implementation, each specific game may include three items per tier. Assuming an average player plays approximately 1.6 games, this leads to approximately five items.

In one embodiment, the user status 204 may include a points total, a coins total, a first game feed, a second game feed, and/or the like. Also illustrated in FIG. 2, is the ORIP server 211. The ORIP server may store 230 in game actions in one or more database(s) 270, conduct a performance metrics currency computation based on the in game action 220, provide a real time feed (e.g., to a social network 260), and/or the like.

In one embodiment, the metaGame network may also regulate user gain of metaGame units (e.g., points, coins and/or the like), including prevention of attempts to exploit the system and fraud. In one embodiment, the metaGame includes a daily cap on experience earned per user 202 per game to address botting. For example, in one implementation, the user 202 may be limited to 80 points per game per day. In one implementation, the metaGame may further include a global daily cap on experience points per user. For example, a user 202 may be limited to three hundred points per day across network games. In one implementation, the metaGame network may further include a maximum reward point balance alert, a daily cap on reward points spent per user, a daily report on top experience points and reward point gaining users, a daily report on experience and reward point economy inflows, outflows and balances, and/or the like.

In one implementation, the metaGame network may place a daily cap on experience earned per user 202 per game raid, e.g. 100 points per game per day. In one embodiment, the network 250 may place velocity and/or rate limits on earning of experience points and reward points as well as velocity and/or rate limits on the spending of reward points. To show loyalty to metaGame users, users may be grandfathered into a set of levels based on their performance. For example, in one implementation, a grandfathering formula may score users according to their percentile rank along two factors: 1) Total amount purchased in the past year (e.g., top ~50% of buyers) and/or 2) Total number of game-days played in the past year (e.g., top ~10% of user). The user 202 may then be slotted into a level and granted their equivalent reward points based on whichever score is higher.

Figure 3:
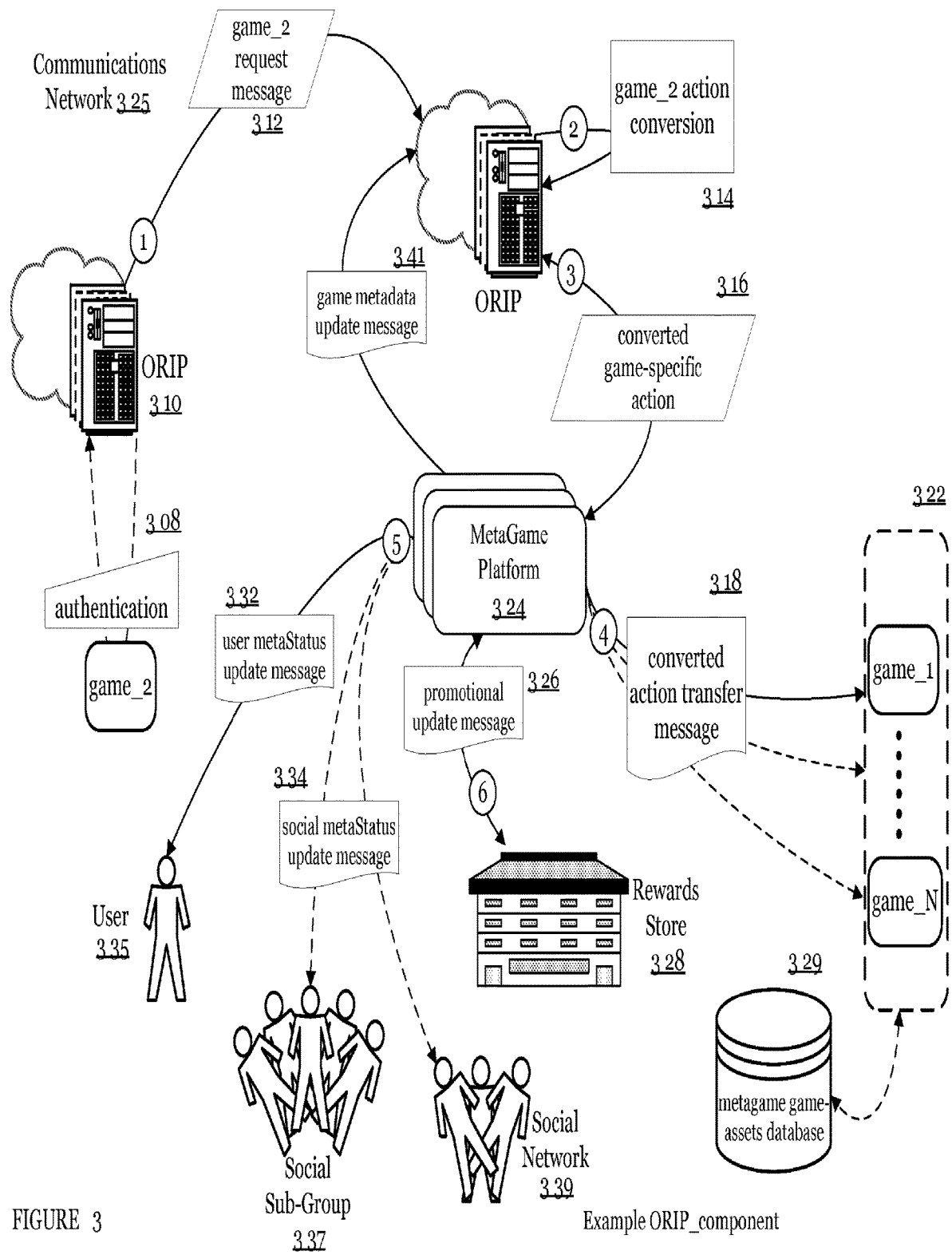
FIG. 3 illustrates some of the transforming aspects in one embodiment of ORIP operations.

In one embodiment, the metaGame platform 280 may be synchronized with applications running over wireless, cellular and/or internet protocols over a heterogeneous network (e.g., desktop computer communicating over encrypted TCP/IP such as ipSec, mobile access device communicating over GSM, WiFi, Bluetooth, tablet communicating over multiple protocols described in more detail below and/or the like). FIG. 3 illustrates some of the transforming aspects in one embodiment of ORIP operations. In one embodiment, the ORIP server 310 may receive an authentication data message from game_2. Without limitation, the ORIP components may receive authentication from the metaGame platform, games 1-N, a social network, and/or a portal site over a communications network 325. According to one embodiment, some of the transforming aspects of the ORIP platform may include obtaining, sending and/or processing a game_2 request message. As illustrated in FIG. 3, the server may convert game_2 actions from the request message. In one embodiment, ORIP operations may communicate the converted game specific action to the metaGame platform 324.

In one implementation, the metaGame platform may operate with or without ORIP components to output a converted action transfer message 318 to games 1-N 322 and store the received converted action transfer message in a metaGame platform assets database 329. According to one illustrated embodiment, the metaGame network may send and/or receive a user metaStatus update message 332, a social metaStatus update message 334, a promotional update message 326, a game metadata update message 341 and/or the like. In one implementation, the noted messages may be directed to a user 335, a social sub-group 337, a social network 339, a rewards store 328 and/or the ORIP server and components. Without limitation, additional detail regarding sample implementations of the reward store illustrated in FIG. 3 may be found in at least the descriptions of FIGS. 4 and 6 below.

In one implementation, the metaGame platform provides allowances for the scalability for inflation or for rebalancing game economies when new games are added to the game network underlying the metaGame. As new games become part of the network, the capacity for a user to add experience points may increase in direct relationship to the new games. The metaGame platform may address this by using rebalancing tools to maintain the desired user progression through the level curve and earning of reward points. In one embodiment, the metaGame may adjust the balance between game allocated experience points and network allocated experience points. The metaGame allocated experience points may be adjusted by changing the game specific allocation cap. The adjustment may be on a per user basis and/or a per game basis. The network allocated experience may be adjusted by changing the experience granted for each action and the number of actions allowed. The metaGame allocation adjustment may be on per user, per day basis, and/or the like. In one embodiment, the metaGame may adjust balance by adding an additional and/or steeper level to the top of the level curve. In one embodiment, the metaGame may change the reward point drip awarded at each level up and unlock point. Additionally, in one implementation, adjustments may be made to the level curve to compensate for a greater average user experience point gain. Changes to metaGame earning rates, the level curve and/or the reward point drip provide a flexible and scalable design.

FIG. 4 illustrates aspects of logic flow operations for one embodiment of the ORIP platform. As illustrated in FIG. 4, aspects of logic flow may include receiving a game-specific account creation message 410 and creating a game specific and/or metaGame account 412. In one embodiment, logic flow may determine if an existing level curve ruleset exists 420. According to one implementation, ORIP operations may request user selection of a level curve ruleset and/or set a default level curve ruleset if a ruleset does not exist and/or is not selected. With a given ruleset, logic flow may include applying the appropriate ruleset to the created game-specific account.

In one embodiment, ORIP operations may include receiving a game-specific in-game action activity message 460. According to one implementation, the ORIP components may check to determine if a game-specific and or metaGame earning event occurred based on the in-game activity message 470, 480. Logic flow may further include, according to one embodiment, an application of central balancing through the allocation of point structures (e.g., coins, cash, experience points and/or the like) across metaGame platform games where the earning event includes a level change 490.

Without limitations, other in game activity messages (e.g., status change, milestone completions and/or the like) may also trigger central balancing through the allocation of point structures. In one implementation, logic flow may obtain privacy settings associated with a user_id, game_id associated with game_specific in-game action activity messages and/or a metaGame_id 491. As illustrated in the example embodiment of FIG. 4, logic flow may update a user's game status advancement based on the applied central balancing and obtained privacy settings 492.

Additional aspects of ORIP logic flow operations may include creating a game account 410 for new users registering to be members of the game network. A new user may register through a referral of an existing metaGame user or with existing rewards that are accepted by the metaGame platform. One embodiment of the ORIP provides monitoring user in-game activity in real-time where a user statistics may be updated with each in-game activity. In such an implementation, ORIP iteratively and in real-time determines if an earning event has occurred (e.g., gaining experience points, purchasing metaGame coins, leveling up, etc.). All earning events completed or attempted by the registered user are updated in real-time to a user's status on the metaGame platform and/or personal account or other networks.

In one embodiment, the metaGame platform may further define earning events 470 and 480 and notification settings based on a user's selected preferences. For example, the trigger for a notification feed may be a level up, complete quest, predetermined number of neighbor visits, level up in metaGame points, a predetermined number of neighbors reached, a predetermined number of consecutive days played, an amount of daily gameplay time, a metaGame points membership, a number of gifts a user's friend sends to others, a number of shared wall points, reward items purchased in the metaGame rewards store, a number of coins spent in a specific game, an in-game purchase, a real world or non-game purchase, and/or the like. In one implementation, once an earning event is trigged, a user's account is updated in real time in.

FIG. 5 illustrates further aspects of logic flow operations for one embodiment of the ORIP platform. As illustrated in FIG. 5, further aspects of the logic flow may include the creation of a metaGame account 510 through receiving a meta-game account authentication card message. In one embodiment, aspects of logic flow may apply a metaGame-defined performance metrics ruleset 530 across a subset of games and/or games 1-N as depicted and described above in FIG. 3. In one implementation, specific games may check for a custom performance ruleset set 520 and/or apply a default performance metrics ruleset 521. In one embodiment where a custom performance metrics ruleset exists, logic flow operations may receive a predefined (e.g., linearly, geometrically, exponentially, genetically (and/or the like) curve progression model message 540. Some of the transforming aspects of the ORIP components may include application of the received progression curve to a game-specific structure gap, a second metrics progression curve and/or a metaGame platform progression curve. According to one implementation, ORIP operations may obtain a player_type defined leveling time structure associated with a progression period (e.g., seconds, minutes, hours, days, weeks, months, years, etc.) and level cap. Logic flow may, according to one embodiment, apply a player-defined leveling time structure to/and or in conjunction with the performance metrics ruleset 570. As illustrated in FIG. 5, ORIP components may track/monitor/store user gameplay including in-game action activity messages and user redemption messages 580. In one embodiment, logic flow operations may check to determine if a game-specific/metaGame earning event and/or level change occurred 590 and 591. According to one implementation, ORIP operations may update 592 an account on a real time basis 592, determine notification preferences 593 and/or transmit a notification message according to the determined preferences 594. Where an earning event and/or level change occurs, one implementation of logic flow operations may receive a metaGame account authentication message (e.g., level change for joining another game on the metaGame network). ORIP operations may further include receiving a meta-game account authentication message when determining notification preferences 593 (e.g., requesting a player to enter a password, pass a reverse Turing test (e.g., CAPTCHA dialog), and/or the like. Logic flow may also, in one implementation, transmit notification messages according to determined preferences 594.

In one embodiment, aspects of logic flow may determine the existence of custom performance metrics which, if they exist, are applied to a user_gamecard 530 and, if not, are defined. The metaGame platform may track/monitor/store user gameplay 550. In one embodiment of the ORIP, the metaGame platform may determine if an earning event has occurred based on a user's in game activity. An earning event may lead to updating the user's account in real time and transmitting and distributing the update to pre-selected channels based on notification preferences if such preferences have been provided and/or are accessible.

FIG. 6 illustrates a sample display element of one component of the ORIP platform in one embodiment. As illustrated in FIG. 6, a gameBar 601 may visually indicate a user's title, level, experience points and metaGame coins. In one embodiment, the gamebar may be an embeddable script. In one implementation, the gameBar may be published to various channels including a metaGame home channel where users may access and/or view their in-game activity. In other embodiments, the gameBar may be a badge, a widget, a tool bar, a ticker scroll, an applet and/or the like. In one embodiment, the metaGame platform may also include a model for defining earning events. In one embodiment, earning events may be weighted relative to other earning events, difficulty, user status and/or the like. For example, an earning event may include a leveling up, consecutive or continuous gameplay, accepting a gift, providing help during a neighbor visit, loading a game, subscribing to a another user's feed, quest completion, receiving a subscription to the user's feed, accepting a friend invite, signing up for a game, receiving an acceptance to an invitation and/or the like.

In one embodiment, redemption of currency such as ZCoins shown in 601 game Bar may only occur if a user has a registered metaGame network account. A user's metaGame units, such as Zpoints, may expire if the user is inactive over a long period of time. In one implementation, these metaGame units are centrally balanced through allocation of units through progression of levels. Redemptive items or rewards may be created by unique game studios following pre-defined value guidelines.

Additional aspects and features may include a mechanism for engaging users at a game network level by rewarding and/or recognizing game play behaviors and milestones on a real time basis across any number of unique included games. For example, metaGame experience points may be earned through in game actions rather than game completion. A metaGame user's status may be visible through designated channels throughout the game network, in real time, such as through xml feeds and/or badges.

In one embodiment, the metaGame network may further include competitions and rewards. For example, the metaGame may present game play discoveries (e.g., find the special shovel) or accomplishments (help 4 friends in 2 games in a single session) that provide special quantities of metaGame units (e.g., points, coins, cash and/or the like) metaGame coins for those users highly motivated to be King and/or Queen of the metaGame. In one embodiment, the metaGame may award extra metaGame points and or metaGame units for users who spend time playing existing network games that they don't normally play. In one implementation, time period based contests and prizes may allow for the accumulation of metaGame Points and/or metaGame units, such a ZPoints or ZCoins.

In one embodiment, additional aspects may include unique rulesets for metaGame units comprised of coins and/or other currency. In one implementation, metaGame currency may be earned initially by leveling up and then eventually through purchases of in game cash (e.g., farm cash in Farmville). In one implementation, the metaGame curve may also function to allow the number of metaGame currency units to be earned by leveling up be a variable defined by a specific game and from level to level. Additionally, some limitations may be placed on how many units of metaGame currency a user may earn, such as per day (i) within a given game and (2) across games played on the metaGame network. In one embodiment, the metaGame currency may be exchangeable for virtual currency or real currency existing outside of the Game network but used to purchase in game currencies.

In one implementation, the metaGame network may define an exact, inexact, hidden, and/or the like relationship between the number of metaGame experience points and game cash value of items purchased in order to earn them. In one embodiment, metaGame coins may not be externally visible, such as outside the user experience, and may have a limited option to redeem the points in the metaGame rewards store. In one embodiment, usage of metaGame coins may be externally visible, at least partially, when a user purchases special items in the rewards store for placement or usage in a unique game, a recursive user benefit. Other modifications and implementation preferences are contemplated as falling within the scope of the claimed technique and are omitted only for purposes of clarity.

In one embodiment, the metaGame may further include a unique incentive rewards structure for metaGameplay. In one embodiment, as a user earns metaGame experience points, the user's metaGame level increases. The award of experience points when a user levels up may be a common intuitive thread of game mechanics across specific games in the metaGame network. A decoupled currency and status weighting also allows for efficient game economy balancing and/or level curve adjustments. Balancing the game economy or adjusting the level curve may be accomplished, in one implementation, by altering the reward of points at the completion of a level. In this regard, the scoring model maintains a transparent game design allowing users to determine the number of experience points required to get to the next level. With each level up, the metaGame platform may, however, additionally award metaGame coins or some other form of metaGame currency. In one embodiment, metaGame currency may be exchangeable with items found in the metaGame rewards store.

In one implementation, the rewards structure ties specific games to the metaGame network by rewarding users at leveling up. According to this game economy, the metaGame provides an incentive for obtaining game currency and achieving game status. Since a level up may advance the user's status by awarding experience points on the metaGame network as well as the specific game, the incentive to continue gameplay is relatively greater than singular game specific incentives. In one embodiment, a network in ORIP holds items in back catalogue to promote or create incentive for rewards.

Certain inflation schemes may be implemented in the gaming networks to adjust economy. In one embodiment, a given inflation scheme may adjust the economy of a specific game. In addition, ORIP operations may also include an inflation scheme to adjust the economy of the metaGame. As an example, in one embodiment of ORIP, users may achieve a linearly increasing points gap between levels and cap-outs at level 70 but even after a level is capped, drip rewards may continue to be awarded. Users may level up and receive ZCoin drip reward on a regular basis. In one implementation, a single game player may take 365 days to reach a level cap, a median player may take 270 days to reach a level cap, or a maximum player may take 100 days to reach a level cap.

In one embodiment, the metaGame platform network may also define earning events for a user's metaGame play. For example, a user may acquire metaGame experience for game specific activities or earning game specific experience points. In one embodiment, the network may place a cap on metaGame experience points a user may earn over a period of time. In one embodiment of the ORIP, games connected to a metaGame platform, such as one operated by Zynga, network may be capped in a pre-selected ZPoints per game per user per day, or user ZPoints may be globally capped per user per day, or a level curve may be capped at, e.g., 70 levels, to prevent a "content treadmill" situation. In such an implementation of the ORIP, caps may reduce impact of potential fraud or abuse. In another embodiment of the ORIP, game economies in a metaGame network may be compartmentalized and controlled centrally in the network, where for example ZCoins may only be earned upon leveling up and/or purchase of game items or in-game currency. Such ZCoins and ZPoints economies may be controlled separately.

In one implementation, the game-specific earning events may be captured in real time synchronization during gameplay of a given game. In addition, the earning events may be asynchronous. For example, the earning events may include user social actions and be displayed during the beginning of a particular game. In one embodiment, experience points do not include an expiration date and/or may not be redeemable for rewards outside the games connected to the metaGame platform.

In one implementation, the metaGame platform may further define a metaLevel and/or a set of levels according to a level curve model. For example, a level curve model may be based, at least in part, on a total amount of metaGame experience acquired by the user. In one embodiment, the level curve includes a level cap for a predetermined period of time. For example, a user may unlock a reward item for every 10 levels the user completes. This may be capped at 7 unlocking iterations or reaching level 70. As users approach level 70, the metaGame platform may increase the cap level. In one embodiment, leveling up may include increasingly intensive visual effects. For example, a first level up may include fireworks where a second and third level up may include progressively explosive firework displays. Each metaLevel or game level advancement may result in an award of metaPoints to the user's metaGame account. In one embodiment, each level may award a predetermined amount of experience points to the user's account.

In one embodiment, the metaGame network may further define a currency, for example metaGame coins or "meta-Coins." Users may purchase metaCoins and/or game-specific coins with real world currency or a social network virtual currency (e.g., Facebook Credits) through a secured transaction over the network. In one embodiment, a user's purchase of coins may result in the reward of experience points. In addition, a user's real world credit card transactions may also result in an award of points to the user's account. In one embodiment, points may expire if the user becomes inactive for a predetermined period of time, e.g., 12 months.

Without limitation, the scoring and performance metrics (e.g., meta- and game-specific experience points, level, coins, and/or the like) may apply different or separate models. In one embodiment, modeling performance metrics may include application of a frequent flyer model, a treadmill model, an activity-event model and/or the like. For example, a leveling game mechanic model may be applied to level advancements and/or level-ups. The leveling game mechanic model provides users with a goal while keeping them engaged in the experience of the game. This prevents the user's virtual goods (e.g., farm produce, pets, etc.) from virtual withering. In one embodiment, the leveling game mechanic model may include engagement incentives like special bonuses in exchange for maintaining a desired activity level. An activity level bonus advantageously provides incentive without penalizing the user with a loss of level. Additionally, a tiered incentive system may apply models of increasing difficulty as the user advances.

Figure 6A:
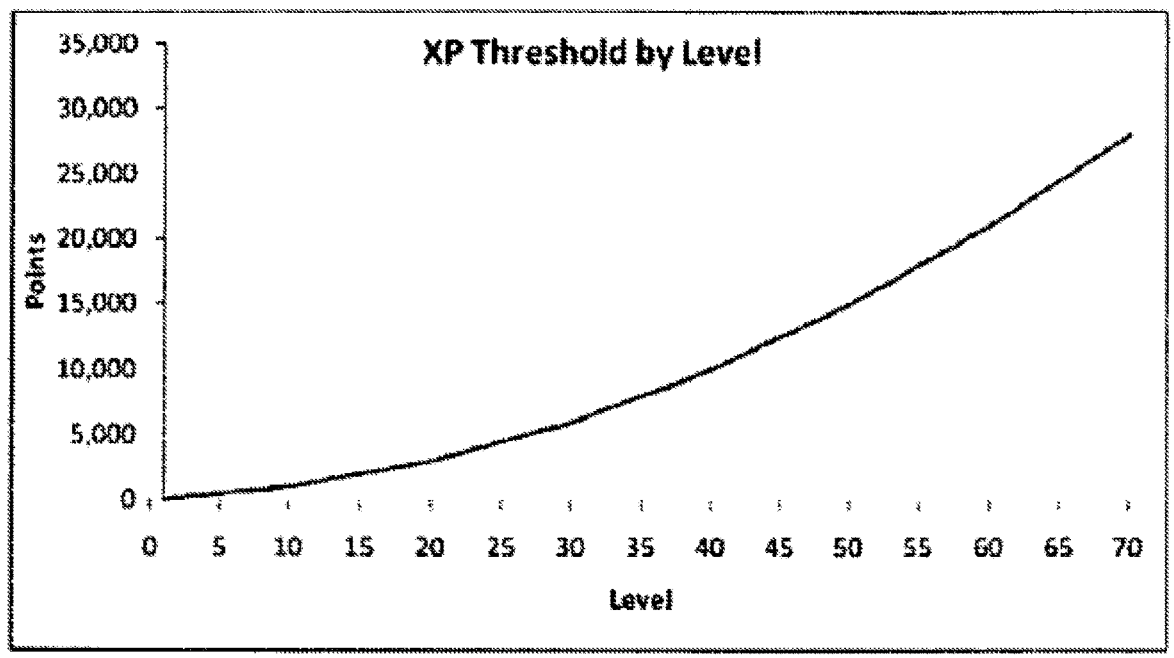
FIG. 6A illustrates a level curve which relates XP threshold (points) to level.

In one embodiment, the metaGame network may include a level curve consistent across network games. In one embodiment, the level curve includes a linearly increasing experience gap between level and ultimate caps at a predetermined level, for example level 70. For example, the level curve may be adjusted so that average gameplay for one day will result in a level up for experienced users at the beginning of a curve. Similarly, the level curve may be adjusted so that an experienced user will not take more than average gameplay time for a week to level up at the top of the curve. One such XPoints threshold by level is shown in FIG. 6A.

In one embodiment, level curve adjustments will allow an average player to reach the ultimate level cap for a specific game around 9 months. The linearly increasing experience points gap allows users to level up and receive metaGame reward points at regular intervals. In one embodiment a level curve metrics such as defined in the table below may be used:

| Level | Cumulative Days to Reach | Days Between Levels | XP Threshold | Coins Awarded At Level Up | Coins awarded At Unlock |
|---|---|---|---|---|---|
| 1 | 1 | 1 | 0 | 8 | 30 |
| 10 | 10 | 2 | 900 | 16 | 56 |
| 20 | 30 | 3 | 2,900 | 24 | 84 |
| 30 | 60 | 4 | 5,900 | 32 | 112 |
| 40 | 100 | 5 | 9,900 | 40 | 140 |
| 50 | 150 | 6 | 14,900 | 48 | 168 |
| 60 | 210 | 7 | 20,900 | 56 | 196 |
| 70 | 280 | 8 | 27,900 | 64 | 224 |

Figure 6B:
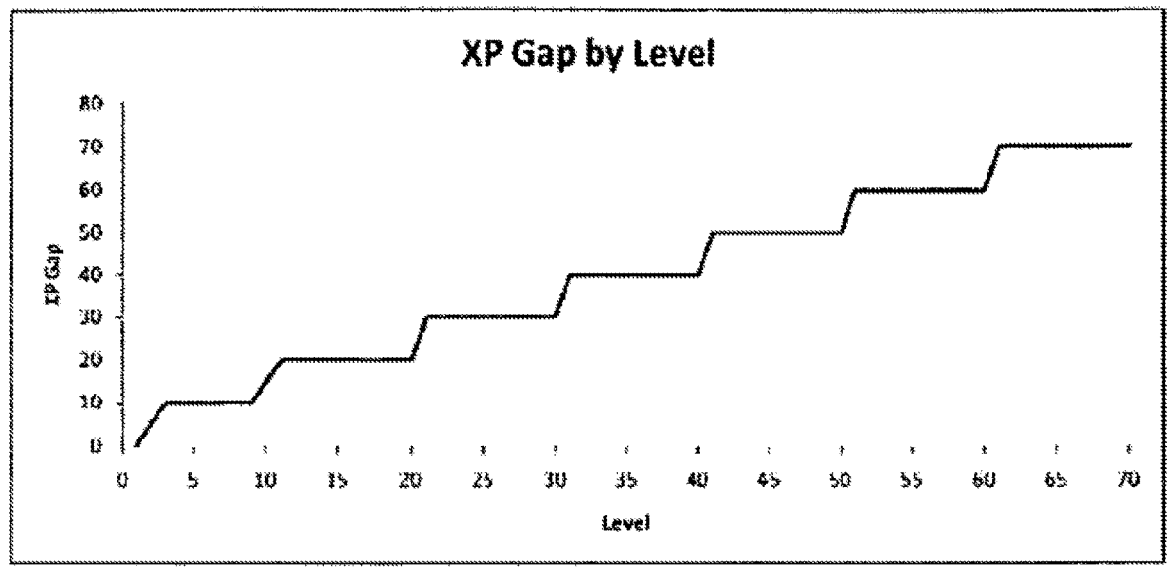
FIG. 6B illustrates a level curve which relates XP Gap to level.

In one implementation, the level cap may provide control over unlocking content items and/or game economy balance by keeping gameplay in sync with content creation. In one implementation, to engage users at the level cap, the metaGame network may provide a rewards point drip as the users fill their experience points bar. In one embodiment XPoints gap by level is shown in FIG. 6B.

The level curve provides a scalable solution to economy balancing, as it may be extended over time with more content unlocks with a steeper curve (e.g., increased challenge of gameplay).

FIG. 7 illustrates aspects of logic flow operations for one embodiment of the ORIP platform. As illustrated, one embodiment of the ORIP platform operations may include receiving an in-game action assets message 710. ORIP platform operations may further include retrieving an in-game assets conversion ruleset 720 and determine if pre-defined conversion preferences exist (e.g., game-specific, metaGame, user and/or the like preferences). In one embodiment, ORIP platform operations, may apply the pre-defined conversion ruleset to the received in-game action asset 734 and/or apply a default conversion ruleset 732 (e.g., game-specific ruleset).

According to one embodiment, ORIP platform operations may determine a game/metaGame valuation status of a received game asset associated with the received in-game action message according to the applied ruleset 740. In one implementation, ORIP platform operations may convert a game asset (e.g., experience points, game currency (coins and/or cash), etc.) associated with the received in-game action message 750. ORIP platform operations may determine whether to change to a specific game/metaGame asset (e.g., game level, level curve, game experience points, game currency and or user-card status. In one embodiment, ORIP operations may update game specific assets and/or metaGame assets (e.g., a saddle is applied to a digital dragon item) 762. ORIP platform operations may also return to receiving in-game action assets messages where a change is not required. In one embodiment, ORIP platform operations may determine 770 and/or retrieve a user-card associated notification preferences ruleset 774. In one embodiment, ORIP platform operations may apply associated user card notification ruleset to update a message recipient list and/or apply a default notification ruleset 772 to update messages to a default recipient list. ORIP platform operations may further include transmitting status notification update messages according to the applied notification ruleset 780.

FIG. 8 illustrates aspects of logic flow operations for one embodiment of the ORIP platform. In one embodiment, ORIP platform operations may include receiving game_2 action assets message and metaGame conversion ruleset 810. ORIP platform operations may further include determining value of received game_2 action asset based on game level curve and/or user card status from meta game conversion ruleset 820. According to one implementation, ORIP platform operations may determine if redeemable rewards are identified 830. Additionally, ORIP platform operations may include obtaining game specific and metaGame asset list available for exchange based on determined value 840. In one embodiment, ORIP platform operations may include receiving game_1 assets selection from asset list available for exchange 850. As illustrated in the embodiment of FIG. 8, ORIP operations may apply transfer of selected game_1 assets, credit game_1 with selected asset, debit game_2 assets status and synchronize metaGame assets 860. In one implementation, the ORIP platform may update metaGame status with transfer between games and synchronized meta-assets 870 and/or share asset acquisition update message with network 880.

FIG. 9 illustrates aspects of logic flow operations for one embodiment of the ORIP platform. As illustrated in FIG. 9, ORIP platform operations may include receiving game_1-game_N action and metaGame action asset messages. In one embodiment, ORIP platform operations may determine user feed preferences based on social filter graph. According to one implementation, the ORIP platform may send game asset updates to network_ids according to social filter graph. In one embodiment, ORIP platform operations may receive filter request messages from user and network_ids. According to the illustrated embodiment of FIG. 9, ORIP operations may send updates to game_1-game_N, metaGame account and/or privacy based on the received filter requests. ORIP operations may further include synchronizing game_1-game_N, metaGame account with received action asset messages and updated account and/or privacy filter requests.

ORIP Controller

Figure 10:
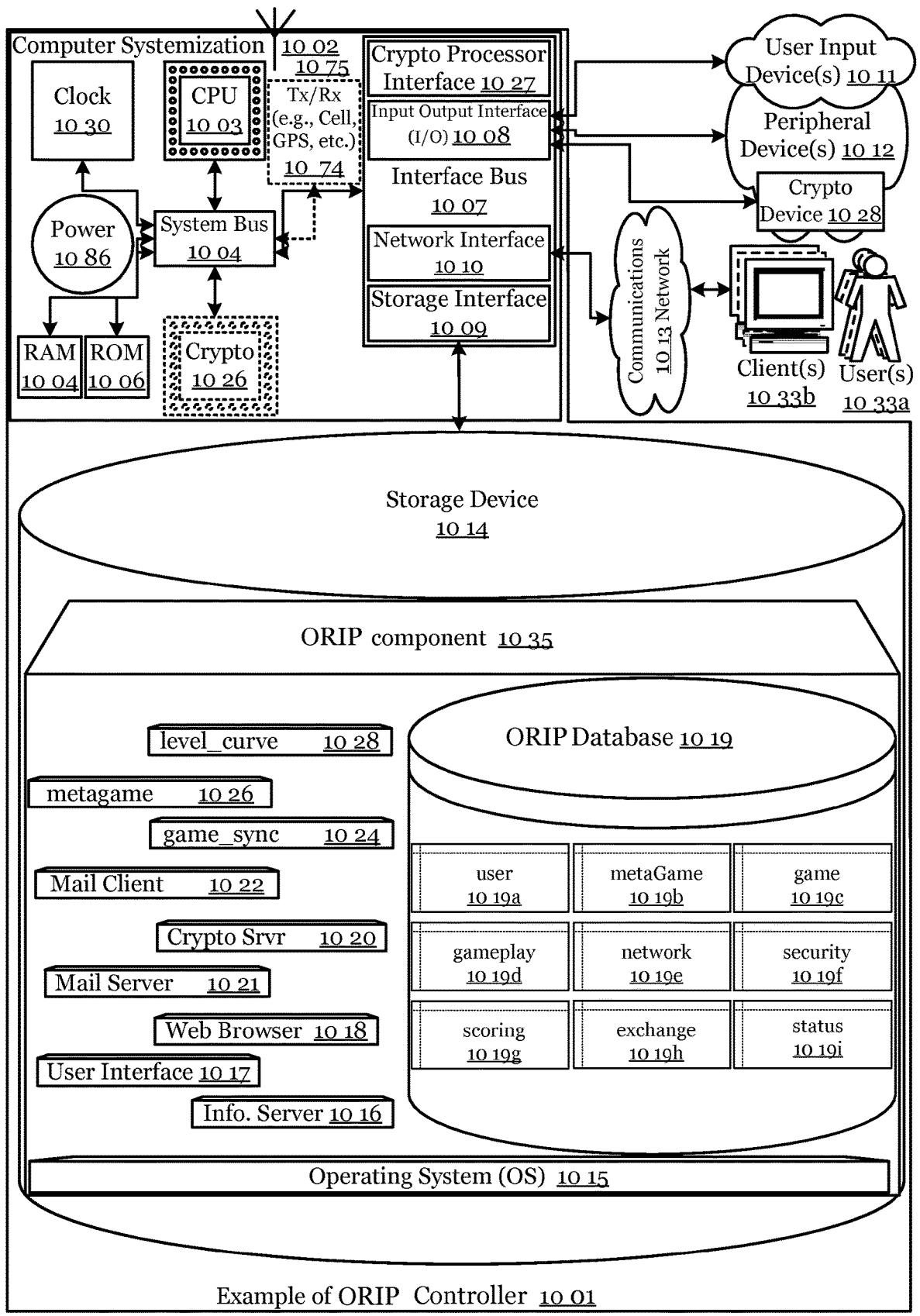
FIG. 10 illustrates one embodiment of the ORIP controller.

FIG. 10 shows one embodiments of the ORIP controller. In this embodiment, the ORIP controller 1001 may serve to aggregate, process, store, search, serve, identify, instruct, generate, match, and/or facilitate interactions with a computer through software, listing service and financial management technologies, and/or other related data.

Users may engage information technology (e.g., computers) to facilitate information processing. In turn, computers employ processors to process information; such processors 1003 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed include: input and output mechanisms through which data may pass into and out of a computer; memory storage into which data may be saved; and processors by which information may be processed. These information technology resources may be used to collect data for later retrieval, analysis, and manipulation, which may be facilitated through a database program.

In one embodiment, the ORIP controller 1001 may be connected to and/or communicate with: a processor 1003 or central processing unit ("CPU"); one or more users from user input devices loll; peripheral devices 1012; an optional cryptographic processor device 1028; and/or a communications network 1013.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers and/or clients across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ORIP controller 1001 may be based on a computer systemization 1002 connected to the ORIP component 1035. The APPARATUSES, METHODS AND SYSTEMS FOR AN ONLINE REWARDS INCENTIVE PROGRAM (hereinafter "ORIP") transforms user gameplay inputs via ORIP components into incentive rewards outputs. In one embodiment the ORIP provides a processor-implemented online rewards incentive method that obtains a metaGame account creation data message. Also, the ORIP may monitor user gameplay associated with a metaGame account and provide a rewards incentive in exchange for user gameplay activities.

Computer Systemization

A computer systemization 1002 may comprise a clock 1030, central processing unit ("CPU(s)" and/or "processor(s)" (these terms are used interchangeable throughout the disclosure unless noted to the contrary)) 1003, a memory (e.g., a read only memory (ROM) 1006, a random access memory (RAM) 1004, etc.), and/or an interface bus 1007. These components may be interconnected and/or communicating through a system bus 1004 on one or more (mother) board(s) 1002 having conductive and/or otherwise transportive circuit pathways through which instructions (e.g., binary encoded signals) may travel to effectuate communications, operations, storage, etc. The computer systemization may be connected to a power source 1086. The power source may be external or internal to the respective computer systemization. A cryptographic processor 1026 and/or transceivers (e.g., ICs) 1074 may be connected to the system bus. In another embodiment, the cryptographic processor and/or transceivers may be connected as either internal and/or external peripheral devices 1012 via the interface bus I/O. The transceivers may be connected to antenna(s) 1075, thereby effectuating wireless transmission and reception of various communication and/or sensor protocols. For example, the antenna(s) may connect to: a Texas Instruments WiLink WL1283 transceiver chip (e.g., providing 802.11n, Bluetooth 3.0, FM, global positioning system (GPS) (thereby allowing ORIP controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock may include a crystal oscillator and generates a base signal through the computer systemization's circuit pathways. The clock may be coupled to the system bus and various clock multipliers that may increase or decrease the base operating frequency for other components interconnected in the computer systemization. The clock and various components in a computer systemization may drive signals embodying information. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in some embodiments, any of the above components may be connected directly to one another, connected to the CPU, and/or organized in numerous variations.

The CPU may comprise data processor adequate to execute program components for executing user and/or ORIP-generated requests. A processor may include specialized processing units. For example, a processor may include integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to data processing techniques. Such instruction passing facilitates communication within the ORIP controller and beyond through various interfaces. Should processing requirements dictate a greater amount speed and/or capacity, distributed processors (e.g., Distributed ORIP), mainframe, multi-core, parallel, and/or super-computer architectures may similarly be employed. Alternatively, should deployment requirements dictate greater portability, smaller Personal Digital Assistants (PDAs) may be employed.

Features of the ORIP may be achieved by implementing a microcontroller such as CAST's R8051XC2 microcontroller; Intel's MCS 51 (i.e., 8051 microcontroller); and/or the like. Some feature implementations may include embedded components, such as: Application-Specific Integrated Circuit ("ASIC"), Digital Signal Processing ("DSP"), Field Programmable Gate Array ("FPGA"), and/or the like embedded technology. For example, any of the ORIP component collection (distributed or otherwise) and/or features may be implemented via the microprocessor and/or via embedded components; e.g., via ASIC, coprocessor, DSP, FPGA, and/or the like. Alternately, some implementations of the ORIP may be implemented with embedded components that are configured and used to achieve a variety of features or signal processing.

The embedded components may include software solutions, hardware solutions, and/or some combination of both hardware/software solutions. For example, ORIP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer to implement the ORIP features. A hierarchy of programmable interconnects allow logic blocks to be interconnected as needed by the ORIP administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. The ORIP may be developed on FPGAs and/or migrated into a fixed version that more resembles ASIC implementations. Alternate or coordinating implementations may migrate ORIP controller features to a final ASIC instead of or in addition to FPGAs. Embedded components and microprocessors may be considered the "CPU" and/or "processor" for the ORIP.

Power Source

The power source 1086 may be of any form for powering electronic circuit board devices. Power cells may include alkaline, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1086 may be connected to at least one of the interconnected subsequent components of the ORIP platform thereby providing an electric current to all subsequent components. In one example, the power source 1086 is connected to the system bus component 1004. An outside power source 1086 may be connected across the I/O 1008 interface. For example, a USB and/or IEEE 1394 connection carries both data and power across the connection and is therefore a suitable source of power.

Interface Adapters

Interface bus(ses) 1007 may accept, connect, and/or communicate to a number of interface adapters, conventionally although not necessarily in the form of adapter cards, such as but not limited to: input output interfaces (I/O) 1008, storage interfaces 1009, network interfaces 1010, and/or the like. Optionally, cryptographic processor interfaces 1027 similarly may be connected to the interface bus. The interface bus provides for the communications of interface adapters with one another as well as with other components of the computer systemization. Interface adapters are adapted for a compatible interface bus. Interface adapters may connect to the interface bus via a slot architecture. Some slot architectures may include: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1009 may accept, communicate, and/or connect to a number of storage devices such as, but not limited to: storage devices 1014, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like. Network interfaces 1010 may accept, communicate, and/or connect to a communications network 1013. Through a communications network 1013, the ORIP controller is accessible through remote clients 1033*b* (e.g., computers with web browsers) by users 1033*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed ORIP), architectures may similarly be employed to pool, load balance, and/or otherwise increase the communicative bandwidth required by the ORIP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 410 may be used to engage with various communications network types 1013. For example, multiple network interfaces may be employed to allow for the communication over broadcast, multicast, and/or unicast networks.

Input Output interfaces (I/O) 1008 may accept, communicate, and/or connect to user input devices 1011, peripheral devices 1012, cryptographic processor devices 1028, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.). User input devices 1011 often are a type of peripheral device 1012 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like. Peripheral devices 1012 may be connected and/or communicate to I/O and/or other facilities of the like such as network interfaces, storage interfaces, directly to the interface bus, system bus, the CPU, and/or the like. Peripheral devices may be external, internal and/or part of the ORIP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 1028), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the ORIP controller may be embodied as an embedded, dedicated, and/or monitor-less (i.e., headless) device, wherein access would be provided over a network interface connection.

Cryptographic units such as, but not limited to, microcontrollers, processors 1026, interfaces 1027, and/or devices 1028 may be attached, and/or communicate with the ORIP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1029. However, memory is a fungible technology and resource, thus, any number of memory embodiments may be employed in lieu of or in concert with one another. It is to be understood that the ORIP controller and/or a computer systemization may employ various forms of memory. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory will include ROM 1006, RAM 1005, and a storage device 1014. A storage device 1014 may be any conventional computer storage. Storage devices may include a (fixed and/or removable) magnetic disk drive; a magneto-optical drive; an optical drive (i.e., Bluray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to: operating system component(s) 1015 (operating system); information server component(s) 1016 (information server); user interface component(s) 1017 (user interface); Web browser component(s) 1018 (Web browser); database(s) 1019; mail server component(s) 1021; mail client component(s) 1022; cryptographic server component(s) 1020 (cryptographic server); the ORIP component(s) 1035; and/or the like (i.e., collectively a component collection). These components may be stored and accessed from the storage devices and/or from storage devices accessible through an interface bus. Although non-conventional program components such as those in the component collection, typically, are stored in a local storage device 1014, they may also be loaded and/or stored in memory such as: peripheral devices, RAM, remote storage facilities through a communications network, ROM, various forms of memory, and/or the like.

Operating System

The operating system component 1015 is an executable program component facilitating the operation of the ORIP controller. Typically, the operating system facilitates access of I/O, network interfaces, peripheral devices, storage devices, and/or the like. The operating system may be a highly fault tolerant, scalable, and secure such as: Apple Macintosh OS X (Server); AT&T Nan 9; Be OS; Unix and Unix-like distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. Other operating systems may also be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ORIP controller to communicate with other entities through a communications network 1013. Various communication protocols may be used by the ORIP controller as a subcarrier transport mechanism for interaction, such as, but not limited to: multicast, TCP/IP, UDP, unicast, and/or the like.

Information Server

An information server component 1016 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ORIP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ORIP database 1019, operating systems, other program components, user interfaces, Web browsers, and/or the like.

Access to the ORIP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ORIP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ORIP as a query. Upon generating query results from the query, the results are passed over the bridge mechanism, and may be parsed for formatting and generation of new results Web page by the bridge mechanism. Such a new results Web page is then provided to the information server, which may supply it to the requesting Web browser.

Also, an information server may contain, communicate, generate, obtain, and/or provide program component, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1017 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components through textual and/or graphical facilities. The user interface provides a facility through which users may affect, interact, and/or operate a computer. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, user, and/or data communications, requests, and/or responses.

Web Browser

A Web browser component 1018 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, user, and/or data communications, requests, and/or responses. Also, in place of a Web browser and information server, a combined application may be developed to perform similar operations of both. The combined application would similarly affect the obtaining and the provision of information to users, user agents, and/or the like from the ORIP enabled nodes.

Mail Server

A mail server component 1021 is a stored program component that is executed by a CPU 1003. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the ORIP.

Access to the ORIP mail may be achieved through a number of APIs offered by the individual Web server components and/or the operating system.

Also, a mail server may contain, communicate, generate, obtain, and/or provide program component, user, and/or data communications, requests, information, and/or responses.

Mail Client

A mail client component 1022 is a stored program component that is executed by a CPU 1003. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, user, and/or data communications, requests, information, and/or responses. Generally, the mail client provides a facility to compose and transmit electronic mail messages.

Cryptographic Server

A cryptographic server component 1020 may include a stored program component that is executed by a CPU 1003, cryptographic processor 1026, cryptographic processor interface 1027, cryptographic processor device 1028, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component is operable to facilitate numerous (encryption and/or decryption) security protocols such as, but not limited to: checksum, Data Encryption Standard (DES), Elliptical Curve Encryption (ECC), International Data Encryption Algorithm (IDEA), Message Digest5 (MD5, which is a one way hash operation), passwords, Rivest Cipher (RC5), Rijndael, RSA (which is an Internet encryption and authentication algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the ORIP may encrypt all incoming and/or outgoing communications and may serve as node within a virtual private network (VPN) with a wider communications network. The cryptographic component is operable to facilitate the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the ORIP component to engage in secure transactions if so desired. The cryptographic component facilitates the secure accessing of resources on the ORIP and facilitates the access of secured and/or remote resources For example, the cryptographic component may act as a client and/or server of secured resources. In one embodiment, the cryptographic component communicates with information servers, operating systems, other program components, and/or the like. The cryptographic component may contain, communicate, generate, obtain, and/or provide program component, user, and/or data communications, requests, and/or responses.

The ORIP Database

The ORIP database component 1019 may be embodied in a database and its stored data. The database may include a stored program component, which may be executed by the CPU; the stored program component portion configuring the CPU to process the stored data. The database may be a conventional, fault tolerant, relational, scalable, secure database such as Oracle or Sybase. Relational databases may include extensions of a flat file(s). Relational databases may comprise a series of related tables. In some embodiments, the tables may be interconnected or associated via a key field. Use of the key field allows the combination of the tables by indexing against the key field; i.e., the key fields act as dimensional pivot points for combining information from various tables. Relationships generally identify links maintained between tables by matching primary keys. Primary keys may represent fields that uniquely identify the rows of a table in a relational database. More precisely, they uniquely identify rows of a table on the "one" side of a one-to-many relationship.

In one embodiment, the ORIP database may be implemented using various standard data-structures, such as an array, hash, (linked) list, structured document or text file (e.g., XML), table, and/or the like. Such data-structures may be stored in memory and/or in (structured) files. In one embodiment, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases where objects may include encapsulated capabilities. If the ORIP database is implemented as a data-structure, the use of the ORIP database 1019 may be integrated into another component such as the ORIP component 1035. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1019 includes several tables 1019*a-i*. A user table 1019*a* includes fields such as, but not limited to: user_name, user_identifier, user_address, user_email, user_login, user_game, user_experience_points, user_level; user_cash, user_history and/or the like. The user table may support and/or track multiple user accounts on the ORIP platform.

A metaGame table 1019*b* includes fields such as, but not limited to: metaGame_identifier, metaGame_games, metaGame_associations, metaGame_users, metaGame_network, metaGame_leaders, metaGame_feed and/or the like. The metaGame table may support and/or track multiple metaGame accounts on the ORIP platform.

A game table 1019*c* includes fields such as, but not limited to: game identifier, game_type, game_players, game_owner, game_currency, game_objects and/or the like. The game table may support and/or track multiple game accounts on the ORIP platform.

A gameplay table 1019*d* includes fields such as, but not limited to: gameplay_identifier, gameplay_type, gameplay associations, gameplay difficulty, gameplay_level and/or the like. The gameplay table may support and/or track multiple gameplay accounts on the ORIP platform.

A network table 1019*e* includes fields such as, but not limited to: network_identifier, network_associations, network_fee, network address, network login and/or the like. The network table may support and/or track multiple network accounts on the ORIP platform.

A security table 1019*f* includes fields such as, but not limited to: security_identifier, security_biometrics, security_associations, security_address, security_website, security_login and/or the like. The security table may support and/or track multiple security accounts on the ORIP platform.

A scoring table 1019*g* includes fields such as, but not limited to: scoring_identifier, scoring_type, scoring_user, scoring_associations, scoring_rewards, scoring_levelcurve and/or the like. The scoring table may support and/or track multiple scoring accounts on the ORIP platform.

An exchange table 1019*h* includes fields such as, but not limited to: exchange_identifier, exchange_type, exchange_currency, exchange_rate, exchange_associations, exchange_store, exchange_user and/or the like. The exchange table may support and/or track multiple exchange accounts on the ORIP platform.

A user_gamecard table 1019*i* includes fields such as, but not limited to: gamecard_identifier, game_type, user_gamecard_level, user_gamecard_network, user_gamecard_website, user_gamecard associations, user_gamecard_levelcurve and/or the like. The user_gamecard table may support and/or track multiple user_gamecard accounts on the ORIP platform.

In one embodiment, the ORIP database may interact with other databases. For example, employing a distributed database, queries and data access by search ORIP component may treat the combination of the ORIP database, an integrated data security layer database as a single database entity.

In one embodiment, user programs may contain various user interface primitives, which may serve to update the ORIP. Also, various accounts may require custom database tables depending upon the environments and the types of clients the ORIP may need to serve. It should be noted that any unique fields may be designated as a key field throughout. In an alternative embodiment, these tables have been decentralized into their own databases and their respective database controllers (i.e., individual database controllers for each of the above tables). Employing advantageous data processing techniques, one may further distribute the databases over several storage devices. Similarly, configurations of the decentralized database controllers may be varied by consolidating and/or distributing the various database components 1019. The ORIP may be configured to keep track of various settings, inputs, and parameters via database controllers.

The ORIP database may communicate to and/or with other components in a component collection, including itself, and/or facilities of the like. Most frequently, the ORIP database communicates with the ORIP component, other program components, and/or the like. The database may contain, retain, and provide information regarding other nodes and data.

The ORIP Component

The ORIP component 1035 is a stored program component that is executed by a CPU. In one embodiment, the ORIP component incorporates any and/or all combinations of the aspects of the ORIP that was discussed in the previous figures. As such, the ORIP affects accessing, obtaining and the provision of information, services, transactions, and/or the like across various communications networks.

In one embodiment, the ORIP platform transforms user game action inputs, such as in-game activity, via ORIP components 1035 into rewards incentive outputs. As illustrated in FIG. 10, ORIP components may include a game sync component 1024, a metaGame component 1026 and/or a level_curve component 1028, the sample implementations which are described in further detail in at least, for example, the discussion of FIGS. 1-9 above.

The ORIP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the ORIP server employs a cryptographic server to encrypt and decrypt communications. The ORIP component may communicate to and/or with other components in a component collection, including itself, and/or facilities of the like. Most frequently, the ORIP component communicates with the ORIP database, operating systems, other program components, and/or the like. The ORIP may contain, communicate, generate, obtain, and/or provide program component, user, and/or data communications, requests, and/or responses.

Distributed ORIPs

The structure and/or operation of any of the ORIP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through advantageous data processing communication techniques. The configuration of the ORIP controller may depend on the context of implementation. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of implementation.

For example, in some implementations, the ORIP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for APPARATUSES, METHODS AND SYSTEMS FOR AN ONLINE REWARDS INCENTIVE PROGRAM shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a ORIP individual and/or enterprise user, database configuration and/or relational model, data type, data transmission and/or network framework, syntax structure, and/or the like, various embodiments of the ORIP, may be implemented that enable a great deal of flexibility and customization. For example, aspects of the ORIP may be adapted for any commission based or incentivized revenue structure. While various embodiments and discussions of the ORIP have been directed to the video game industry, however, it is to be understood that the embodiments described herein may be readily configured and/or customized for a wide variety of other applications and/or implementations.

What is claimed is:

1. A method, comprising operations of:

receiving, at one or more servers from a client device, a game action associated with a first game of a plurality of online games being played by a user of the client device, wherein each game of the plurality of online games is a unique online game included in an online game network associated with a metagame account for the user and wherein the metagame account is associated with metagame coins that are earned based on game actions performed within each game of the plurality of online games;

updating, using a metagame platform based on the game action, the metagame coins associated with the metagame account, the updating the metagame coins includes using a first conversion ruleset for converting the game action associated with the first game to metagame coins, wherein the metagame platform interfaces with each of the plurality of online games to interconnect game actions of one game of the plurality of online games to game assets of other games of the plurality of online games;

sending, to the client device, data for displaying a graphical user interface (GUI) associated with the metagame platform, the GUI visually indicating the metagame coins associated with the metagame account of the user;

determining, using the metagame platform based on a second conversion rule set, a number of metagame coins for obtaining an item within a second game of the plurality of online games, the GUI associated with the metagame platform enables the user to select the item;

receiving, from the client device, a selection of the item via the GUI for use in the second game of the plurality of online games, the metagame platform deducts the number of metagame coins as determined based on the second conversion ruleset from the metagame coins associated with the metagame account;

executing the second game of the plurality of online games for play by the user and providing, in response to the selection of the item via the GUI, the item for use by the user while interacting with the second game, wherein the item is not usable in the first game;

determining user feed preferences based at least in part on filter request messages and at least in part on privacy settings in the metagame account; and transmitting an update describing use of the item to social network identifiers according to the user feed preferences, wherein transmitting the update includes publishing the update in a real time feed to a social network and wherein each of the operations is executed by one or more processors, and wherein the metagame platform adjusts the first conversion ruleset and the second conversion ruleset based on a skill level of the user respective of the first game and of the second game.

2. The method of claim 1, further comprising operations of:

receiving a filter request message from the user in response to the selection of the item; and updating the metagame account associated to reflect the filter request message.

3. The method of claim 1, further comprising operations of:

receiving a filter request message associated with one of the social network identifiers in response to the selection of the item; and updating the metagame account to reflect the filter request message.

4. The method of claim 1, wherein each online game of the plurality of online games is created by a unique game studio.

5. A system, comprising:

one or more processors; and a memory disposed in communication with the one or more processors and storing processor-executable instructions, the instructions comprising instructions to:

receive, at one or more servers from a client device, a game action associated with a first game of a plurality of online games being played by a user of the client device, wherein each game of the plurality of online games is a unique online game included in an online game network associated with a metagame account for the user and wherein the metagame account is associated with metagame coins that are earned based on game actions performed within each game of the plurality of online games;

update, using a metagame platform based on the game action, the metagame coins associated with the metagame account, the updating the metagame coins includes using a first conversion ruleset for converting the game action associated with the first game to metagame coins, wherein the metagame platform interfaces with each of the plurality of online games to interconnect game actions of one game of the plurality of online games to game assets of other games of the plurality of games;

send, to the client device, data for displaying a graphical user interface (GUI) associate with the metagame platform, the GUI visually indicating the metagame coins associated with the metagame account of the user;

determine, using the metagame platform based on a second conversion ruleset, a number of metagame coins for obtaining an item within a second game of the plurality of online games, the GUI enables the user to select the item;

receive, from the client device, a selection of the item via the GUI for use in the second game of the plurality of online games, the metagame platform deducts the number of metagame coins as determined based on the second conversion ruleset from the metagame coins associated with the metagame account;

execute the second game of the plurality of online games for play by the user and providing, in response to the selection of the item via the GUI, the item for use by the user while interacting with the second game, wherein the item is not usable in the first game;

determine user feed preferences based at least in part on filter request messages and at least in part on privacy settings in the metagame account; and transmit an update describing the purchase of the selected item to social network identifiers according to the user feed preferences, wherein transmitting the update includes publishing the update in a real time feed to a social network, and wherein the metagame platform adjusts the first conversion ruleset and the second conversion ruleset based on a skill level of the user respective of the first game and of the second game.

6. The system of claim 5, further comprising instructions to:

receive a filter request message from the user in response to the selection of the item; and update the metagame account to reflect the filter request message.

7. The system of claim 5, further comprising instructions to:

receive a filter request message associated with one of the social network identifiers in response to the selection of the item; and update the metagame account to reflect the filter request message.

8. The system of claim 5, wherein each online game of the plurality of online games is created by a unique game studio.

9. The method of claim 1, wherein the second game is a unique game unrelated to the first game.

10. The method of claim 1, wherein the updating the metagame coins occurs in real-time or near real-time.

11. The system of claim 5, wherein the second game is a unique game unrelated to the first game.

12. The system of claim 5, wherein metagame coins are updated in real-time or near real-time.

13. A method, comprising:

executing, at one or more servers, a metagame platform associated with a metagame account of a user, the metagame platform interfaces with a plurality of online games to interconnect game actions of one game of the plurality of online games to game assets of other games of the plurality of online games, wherein the metagame account is associated with metagame coins that are earned based on game actions performed within each game of the plurality of online games;

receiving, at the one or more servers from a client device, an indication that a game action has been completed within a first game of the plurality of online games being played by the user of the client device;

updating, using the metagame platform based on the game action, the metagame coins associated with the metagame account, the metagame platform uses a first conversion ruleset for converting the game action to metagame coins for said updating;

determining, using the metagame platform, a number of metagame coins for obtaining an item within a second game of the plurality of online games, the metagame platform uses a second conversion ruleset for said determining the number of metagame coins;

receiving, from the client device, a selection of the item for use in the second game, the metagame platform deducts the number of metagame coins from the metagame coins associated with the metagame account in response to the selection; and executing the second game of the plurality of online games for play by the user and providing, in response to the selection of the item, access to the item for use by the user while interacting with the second game, the item is not usable in the first game.

14. The method of claim 13, wherein the metagame platform adjusts the first conversion ruleset and the second conversion ruleset based on a skill level of the user respective of the first game and the second game.

15. The method of claim 13, wherein when the skill level of the user respective of the first game is different than that respective of the second game, the metagame platform is configured to adjust the first conversion ruleset differently than the second conversion ruleset.

16. The method of claim 13, further comprising:
sending, to the client device, data for displaying a graphical user interface (GUI) associated with the metagame platform, the GUI enables the user to make the selection of the item.

17. The method of claim 13, further comprising:
determining user feed preferences based at least in part on filter request messages and at least in part on privacy settings in the metagame account; and
transmitting an update describing use of the item to social network identifiers according to the user feed preferences, wherein said transmitting the update includes publishing the update in a real time feed to a social network.

18. The method of claim 13, wherein the client device is one of one or more client devices usable to access the plurality of online games.

19. The method of claim 13, wherein the second game is a unique game unrelated to the first game.

20. The method of claim 13, wherein metagame coins are updated in real-time or near real-time.

* * * * *